No. 651,167. Patented June 5, 1900.
J. E. HEWES.
MANUFACTURE OF CARBID OF CALCIUM.
(Application filed Oct. 6, 1899.)
(No Model.)
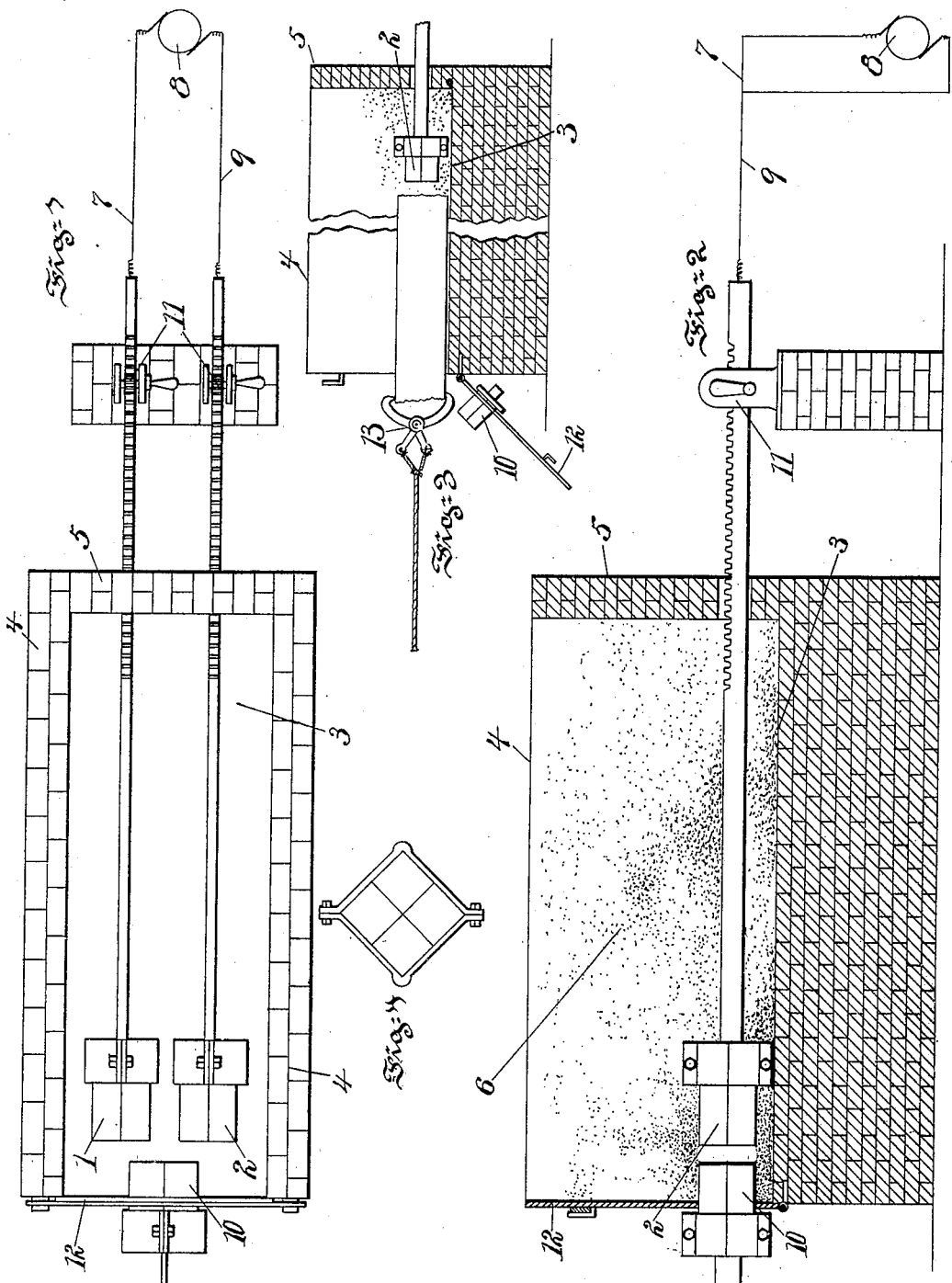

UNITED STATES PATENT OFFICE.

JAMES E. HEWES, OF BALTIMORE, MARYLAND, ASSIGNOR TO THE PROVIDENT LIFE AND TRUST COMPANY, TRUSTEE, OF PHILADELPHIA, PENNSYLVANIA.

MANUFACTURE OF CARBID OF CALCIUM.

SPECIFICATION forming part of Letters Patent No. 651,167, dated June 5, 1900.

Application filed October 6, 1899. Serial No. 732,793. (No specimens.)

*To all whom it may concern:*

Be it known that I, JAMES E. HEWES, a citizen of the United States, and a resident of the city of Baltimore, in the State of Maryland, have invented certain new and useful Improvements in the Manufacture of Carbid of Calcium and the Like, of which the following is a specification.

The object of the present invention is to provide for the continuous, economical, expeditious, and satisfactory production of carbid of calcium and the like of uniformly-good quality.

To this and other ends the invention comprises the improvements hereinafter described and claimed.

The nature, characteristic features, and scope of the invention will be more fully understood from the following description, taken in connection with the accompanying drawings, forming part hereof, and in which—

Figure 1 is a top or plan view of a furnace adapted for use in connection with the invention. Fig. 2 is a view illustrating the same in longitudinal central section. Fig. 3 is a detail view, and Fig. 4 is a view drawn to an enlarged scale and showing the carbon-holder.

In my invention the electrodes 1 and 2 are arranged in horizontal position and disposed parallel with each other. Beneath the electrodes there is a floor 3, from which extend upward walls 4 and 5. Upon this floor and within these walls there is a mass of raw material 6, which may consist of a mixture of coke and lime. The electrodes are buried beneath this mass of material, which is replenished from time to time as required and in order to keep the electrodes buried beneath it. The electrodes 1 and 2 are included in a circuit, as 7, 8, 9. To start the process of producing the product, the electrodes 1 and 2 are short-circuited by way of the part 10, which I will designate an "armature" and which may comprise a block of carbon or other suitable material. Under these circumstances current traverses the path 8 7 1 10 2 9 and back to 8. The electrodes 1 and 2 are withdrawn in the direction of their length and away from the part 10, for example, by means of the mechanism illustrated at 11. Thus arcs are formed between the ends of the electrodes and the part 10, and the heating and reduction of the material commences. As this heating and reduction continues the part 10 is withdrawn, for example, by turning down the hinged wall 12, to which it is attached, until it occupies the position shown in Fig. 3. The path of the circuit is then from one of the electrodes through the material to the other of the electrodes, and the production of the product is carried on. To effect the necessary adjustments and control of the circuit and to properly produce the product, the latter is, as completed, withdrawn away from the electrodes, for example, by means of the apparatus indicated at 13 in Fig. 3.

It may be stated that the finished product is withdrawn alone from the mass of raw material which remains in position for entering the zone or region of reduction. At the same time the electrodes 1 and 2 are shifted either equally and together toward or away from the finished product or they are shifted unevenly in the direction of their lengths, as required for the regulation of the furnace.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

The process of continuously producing carbid of calcium and the like which consists in arranging electrodes in horizontal and parallel position beneath a mass of raw material, completing the circuit through an armature applied to said electrodes and withdrawing and adjusting the electrodes in the direction of their lengths and in respect to the armature to start the formation of the product, removing the armature and completing the circuit through the fused material, adjusting the electrodes endwise evenly or unevenly as may be required in respect to the product to control the circuit, allowing the product to solidify beneath the mass of raw material, and drawing the product from beneath the mass and away from the ends of the electrodes, substantially as described.

In testimony whereof I have hereunto signed my name.

JAMES E. HEWES.

Witnesses:
M. H. HOUSEMAN,
W. J. JACKSON.